(12) United States Patent
Sun et al.

(10) Patent No.: US 7,309,259 B2
(45) Date of Patent: Dec. 18, 2007

(54) ELECTRICAL CARD CONNECTOR WITH SHUTTER MECHANISM

(75) Inventors: Yun-Song Sun, Kunshan (CN); Qi-Jun Zhao, Kunshan (CN); Mao-Lin Lei, Kunshan (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 11/584,963

(22) Filed: Oct. 23, 2006

(65) Prior Publication Data

US 2007/0093132 A1   Apr. 26, 2007

(30) Foreign Application Priority Data

Oct. 21, 2005   (CN) .......................... 2005 2 0076643

(51) Int. Cl.
*H01R 24/00* (2006.01)
(52) U.S. Cl. ..................................................... 439/630
(58) Field of Classification Search ................ 439/630, 439/137, 138, 139, 140, 141; 361/737
See application file for complete search history.

(56) References Cited

U.S. PATENT DOCUMENTS

| | | | |
|---|---|---|---|
| 6,699,053 B2* | 3/2004 | Kuroda ........................ 439/218 |
| 6,716,066 B1* | 4/2004 | Kuo ............................. 439/630 |
| 6,863,571 B2* | 3/2005 | Sato et al. .................... 439/630 |
| 6,960,104 B1 | 11/2005 | Lwee |
| 6,976,879 B2* | 12/2005 | Shishikura et al. .......... 439/630 |
| 7,083,440 B2* | 8/2006 | Shen et al. ................... 439/138 |
| 7,112,095 B2* | 9/2006 | Shen et al. ................... 439/630 |
| 2006/0110959 A1* | 5/2006 | Shen et al. ................... 439/136 |

* cited by examiner

*Primary Examiner*—Chandrika Prasad
(74) *Attorney, Agent, or Firm*—We Te Chung (57) ABSTRACT

An electrical card connector (100) for compatibly insertion of a MINI SD card (91) and a SD card (92), includes an insulative housing (1), a number of first electrical contacts (31) and second electrical contacts (32) retained in the insulative housing, a shielding shell (2) attached to a top of the insulative housing, and a shutter mechanism assembled to the shielding shell. The shielding shell comprises a shaft (8), a rotary portion (6), a pair of bolts (5) each provided with a projecting portion (55) extending above the rotary portion, and a pair of springs (7) exerting a resilient force on the rotary portion.

19 Claims, 10 Drawing Sheets

ELECTRICAL CARD CONNECTOR WITH SHUTTER MECHANISM

BACKGROUND OF THE INVENTION

1. Field of the Invention

The present invention relates to an electrical connector, and particularly to an electrical card connector having a shutter mechanism and being adapted for compatible insertion of at least two kinds of electronic cards, due to an activity of the shutter mechanism.

2. Description of Related Art

Recently, in an electronic instrument, the use of various of electronic cards has been rapidly increased. Therefore, an electrical card connector has been widely required for compatible insertion of at least two kinds of small-sized electronic cards, such as SD (Security Digital) card and MINI SD card.

A conventional composite type card connector described in U.S. Pat. No. 6,863,571 comprises an insulative housing, a cover member, first contact member for a small card, second contact member for a large card, a locking mechanism and an operation mechanism having a movable plate and an operation plate. The locking mechanism is formed with a protrusion and a locking claw engaging with the protrusion. The operation plate is provided with a pair of L-shaped guiding slots each defining a slope section extending obliquely upwardly and a horizontal section extending in a horizontal direction. The movable plate is provided with a pair of projections capable of sliding along the guiding slots. When the small card is inserted into the insulative housing beneath the movable plate, the movable plate is fixed in a lower position, with the projections thereof positioned in the horizontal sections of the guiding slots. When the large card is inserted into the insulative housing, the large card would abut against the locking claw to thereby upwardly push the locking claw. The locking claw is released from the protrusion to unlock the locking mechanism. Therefore, the movable plate is pushed inwardly and upwardly along the insertion direction of the large card, with the projections thereof sliding upwardly from the horizontal section toward the slope section. The large card is completely inserted into the insulative housing.

However, it would produce friction force between the projections and the guiding slots when the projections sliding along the guiding slots to upwardly push the movable plate. Therefore, the sliding movement of the projections would be affected by the friction force. Furthermore, the projections may be impaired under the friction force when the connector is used for a certain long time.

Hence, an improved electrical card connector is required to overcome the above-mentioned disadvantages of the related art.

SUMMARY OF THE INVENTION

A primary object of the present invention is to provide an electrical card connector having a shutter mechanism, which detectively receive cards having different sizes.

To achieve the aforementioned objects, an electrical card connector for compatibly insertion of a MINI SD card and a SD card, comprises an insulative housing, a plurality of first electrical contacts and second electrical contacts retained in the insulative housing, a shielding shell attached to a top of the insulative housing, and a shutter mechanism assembled to the shielding shell and provided with a shaft, a pair of springs and a rotary portion. The shielding shell includes a shaft, a rotary portion, a pair of bolts each provided with a projecting portion extending above the rotary portion, and a pair of springs exerting a resilient force on the rotary portion.

Other objects, advantages and novel features of the invention will become more apparent from the following detailed description of a preferred embodiment when taken in conjunction with the accompanying drawings.

BRIEF DESCRIPTION OF THE DRAWINGS

FIG. 2 is a partially exploded perspective view of the electrical card connector as shown in FIG. 1, with a MINISD card being partially inserted in;

FIG. 3 is an assembled perspective view of the electrical card connector as shown in FIG. 1, with a SD card being inserted in;

FIG. 9 is a cross-sectional view of the electrical card connector as shown in FIG. 2 taken along line 9-9, when the MINISD card is inserted in; and FIG. 10 is a cross-sectional view of the electrical card connector as shown in FIG. 1 taken along line 10-10, when the SD card is inserted in.

DETAILED DESCRIPTION OF THE INVENTION

Figure 9:
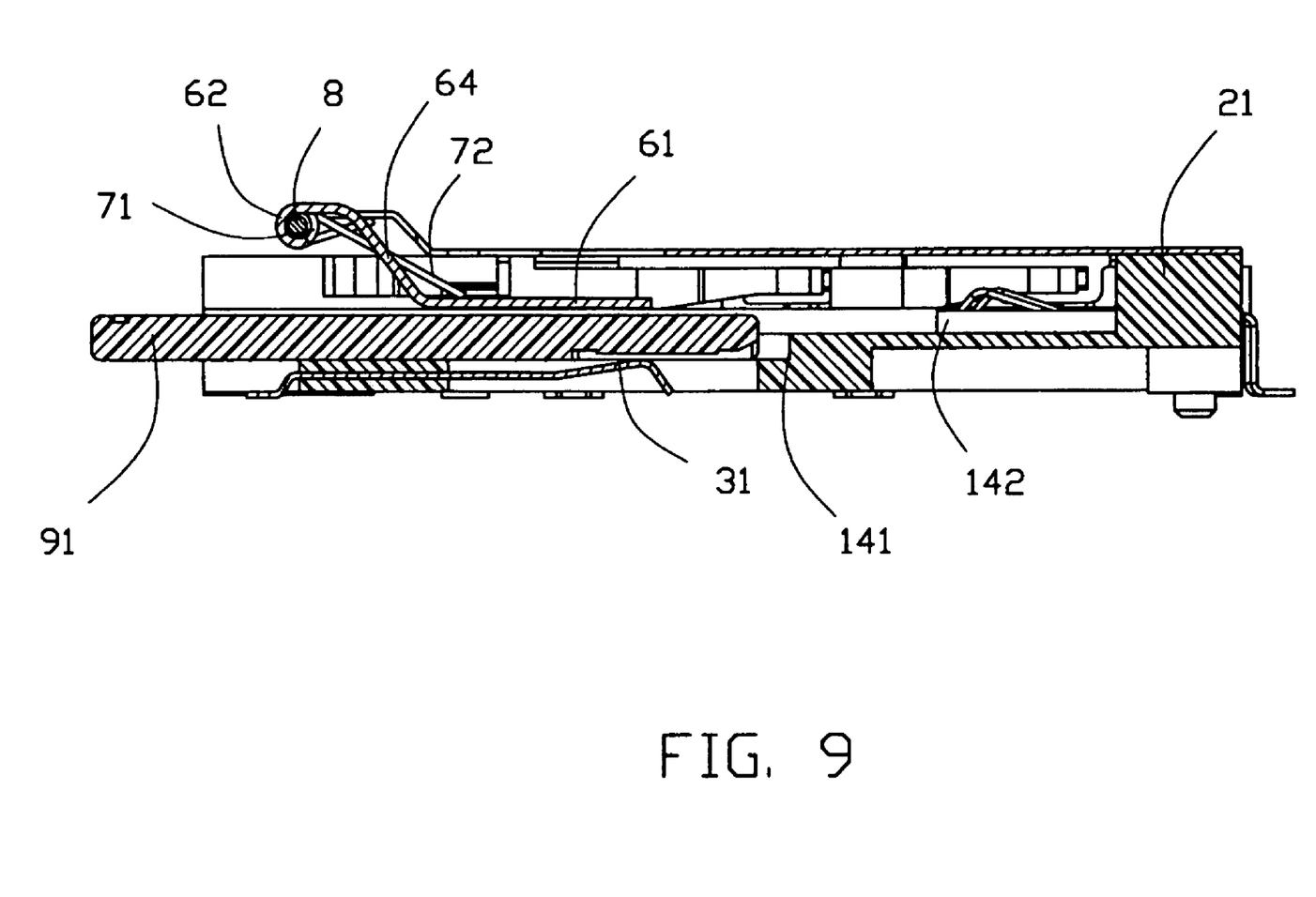
Figure 10:
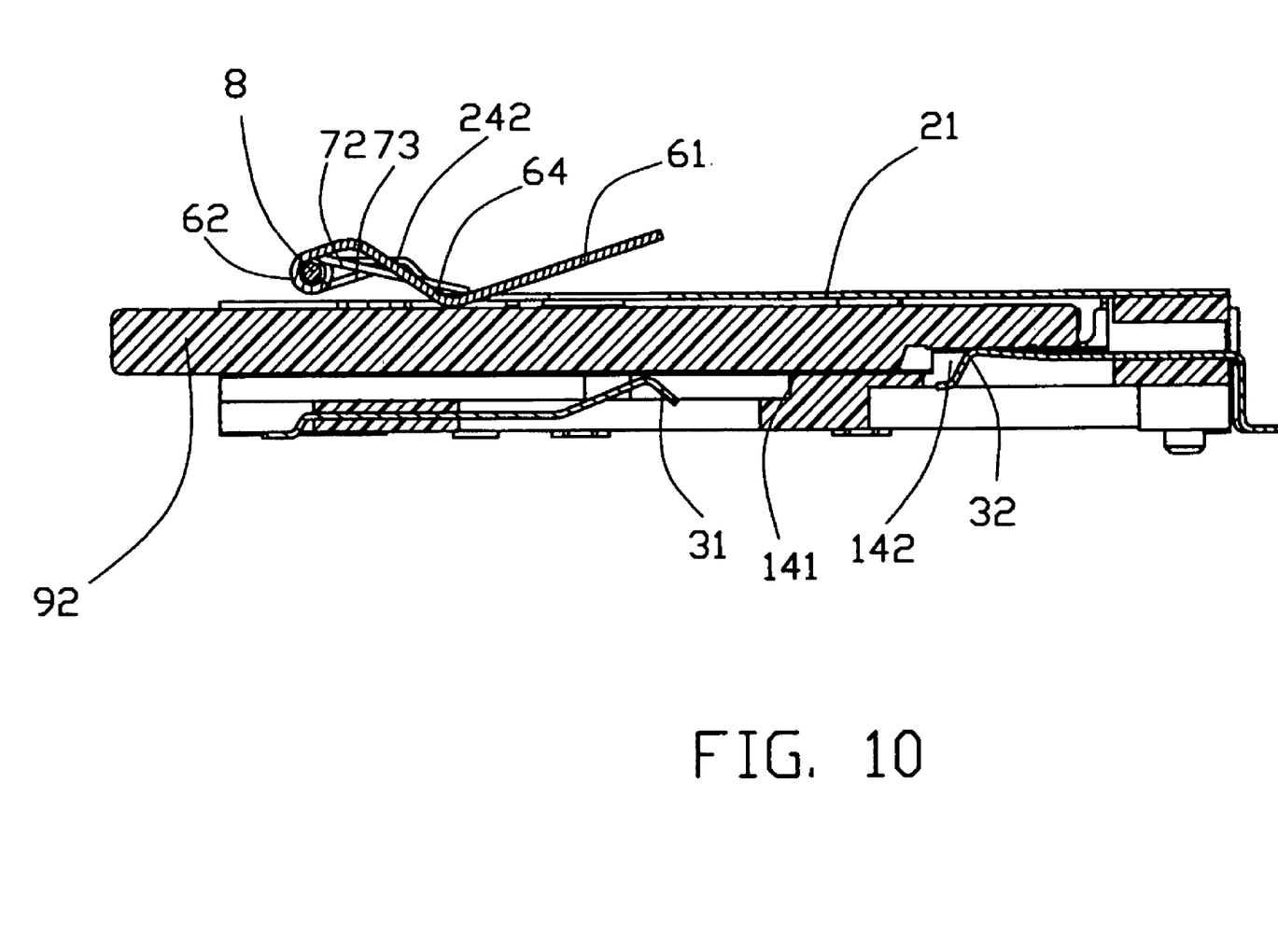

Reference will now be made to the drawing figures to describe the present invention in detail. Referring to FIGS. 9 and 10, an electrical card connector 100 in accordance with the preferred embodiment of the present invention is adapted for compatibly insertion of a MINI SD card 91 and a SD card 92. Compared with the MINI SD card 91, the SD card 92 has a larger dimensions in thickness, width and length.

Figure 4:
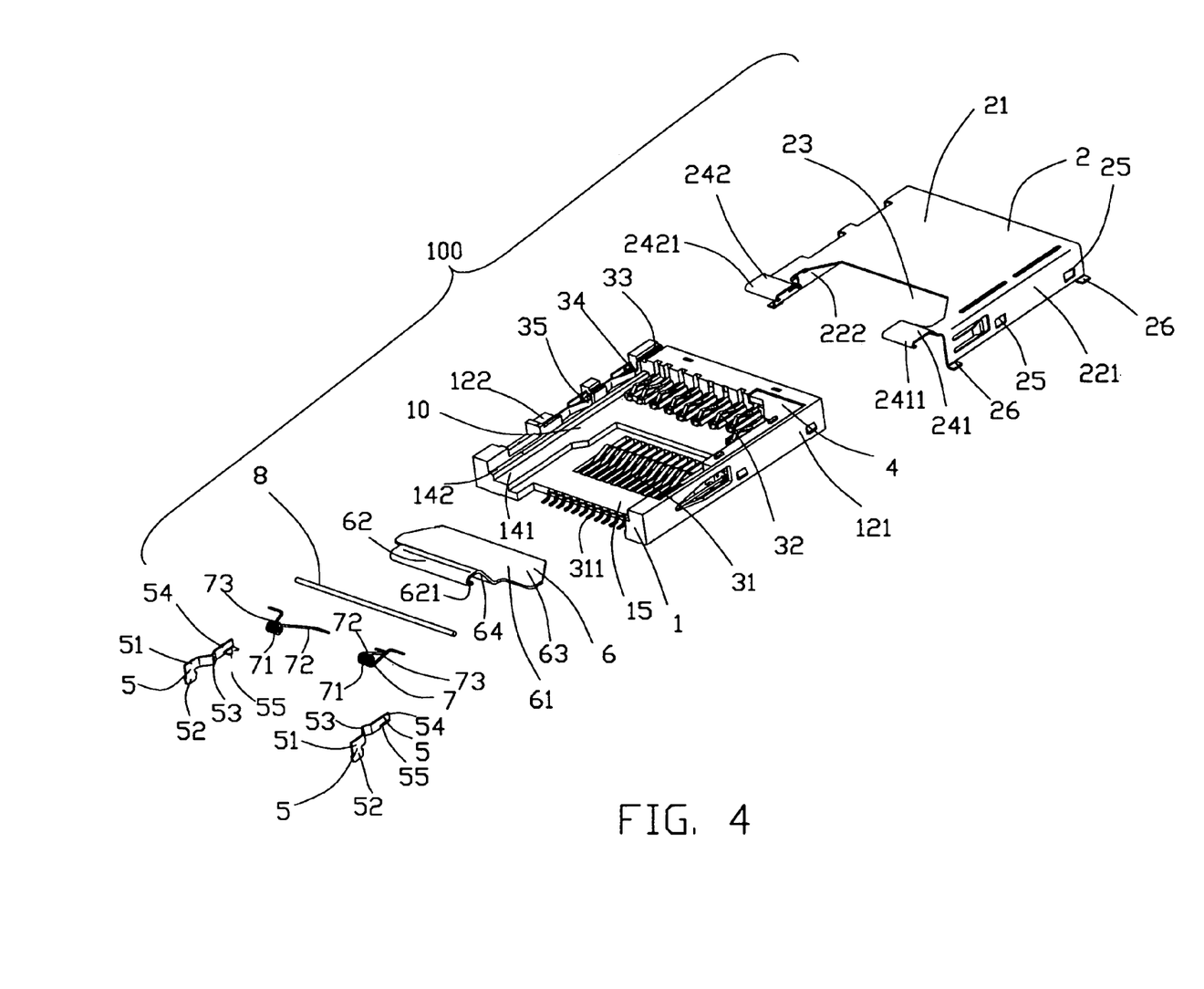
FIG. 4 is an exploded view of the electrical card connector as shown in FIG. 1.
Figure 5:
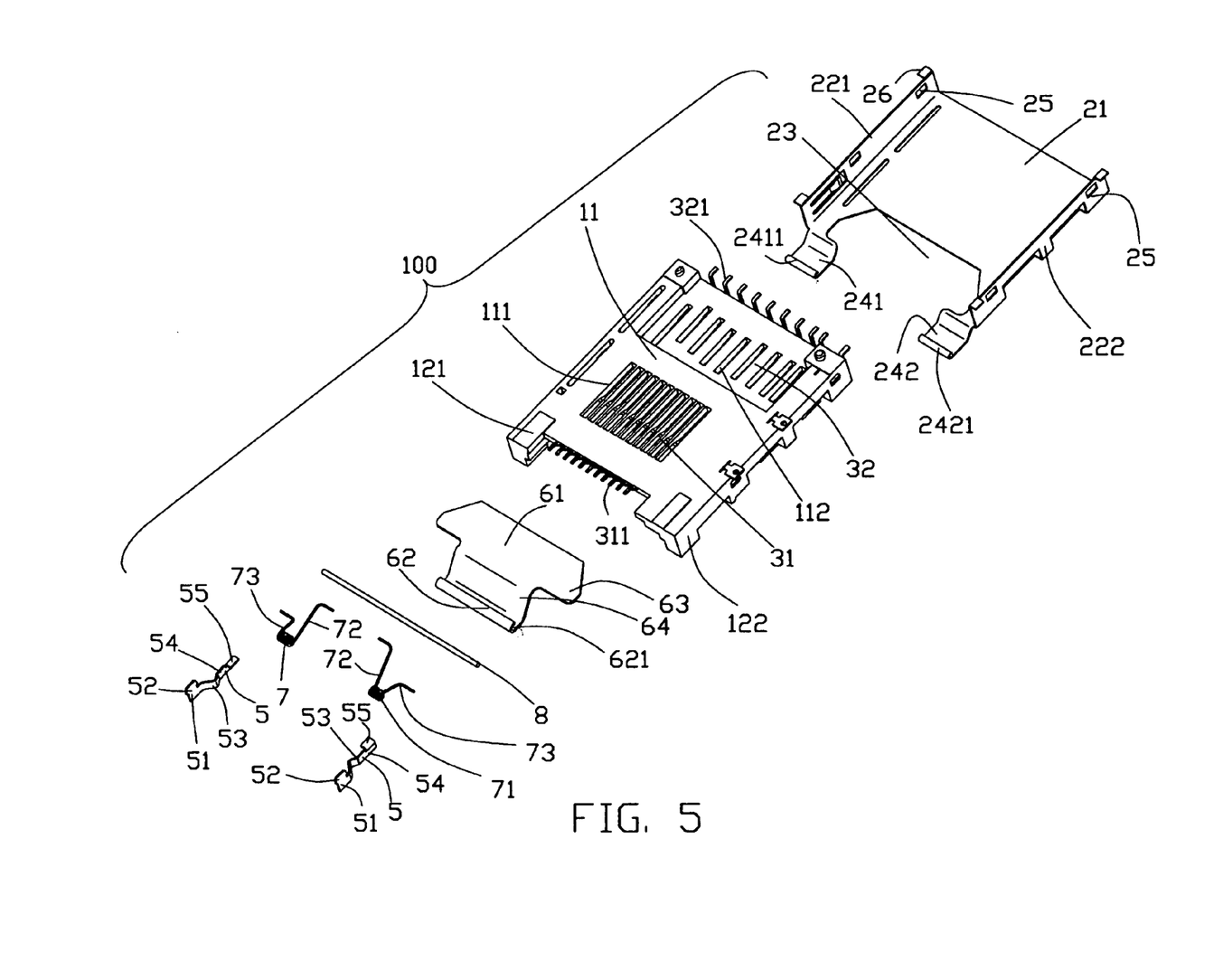
FIG. 5 is an exploded view of the electrical card connector as shown in FIG. 1 taken from another aspect.
Figure 6:
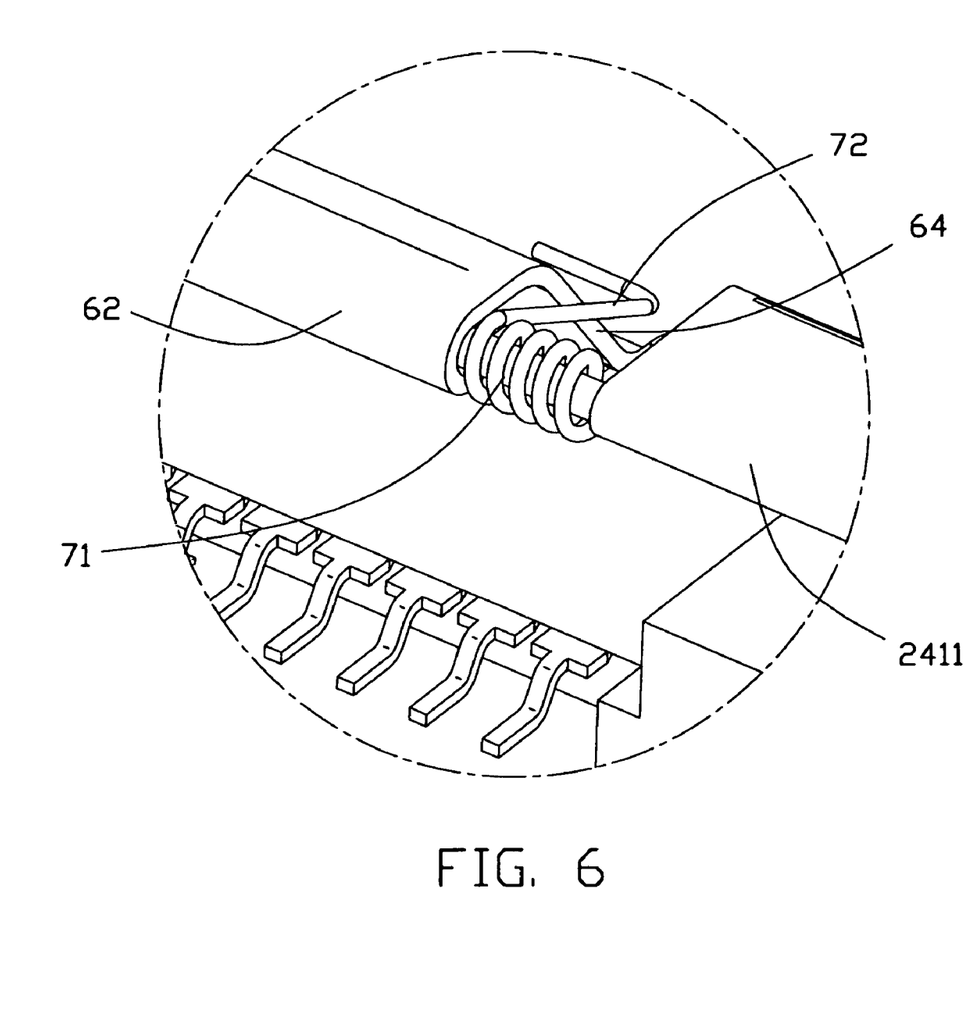
FIG. 6 is a partially enlarged view of the electrical card connector as shown in FIG. 1.
Figure 7:
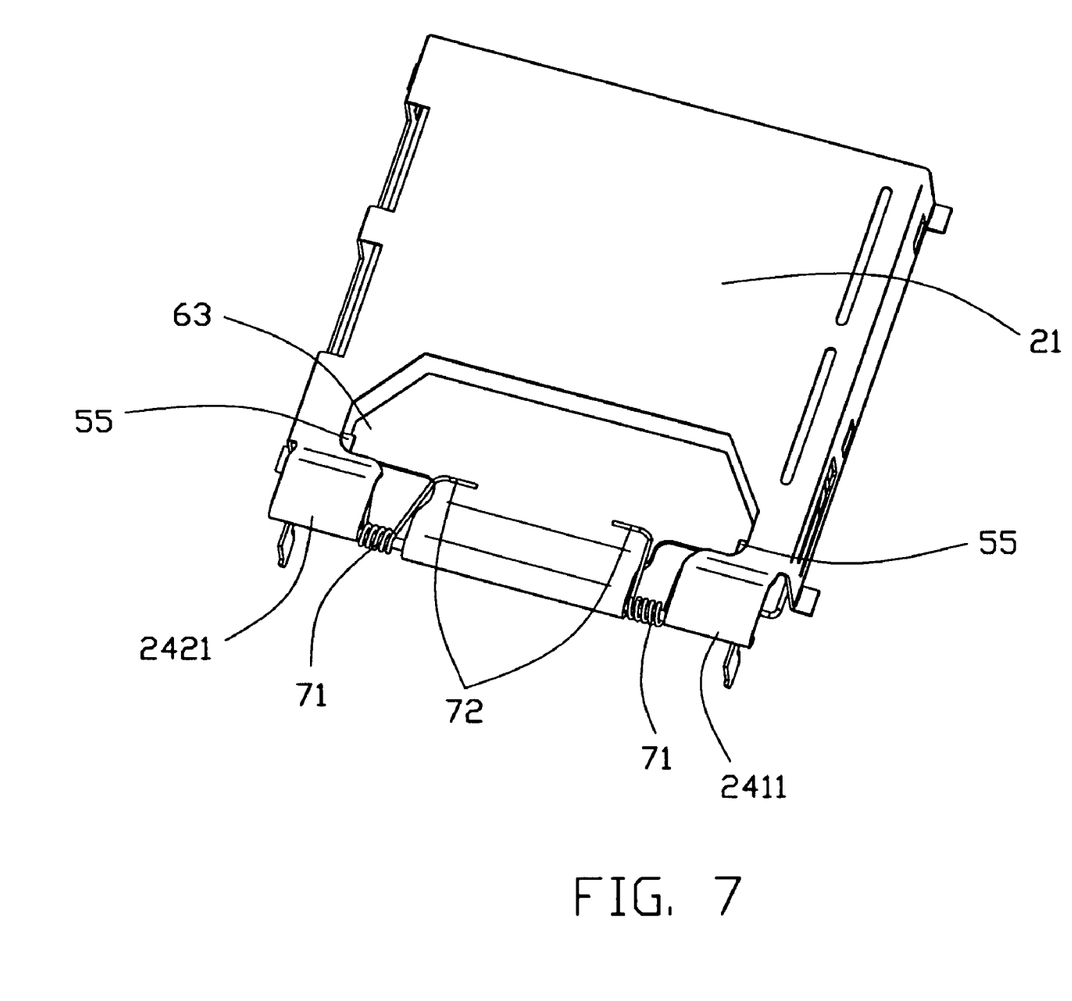
FIG. 7 is an assembled perspective view of a shutter mechanism and a shielding shell as shown in FIG. 1.
Figure 8:
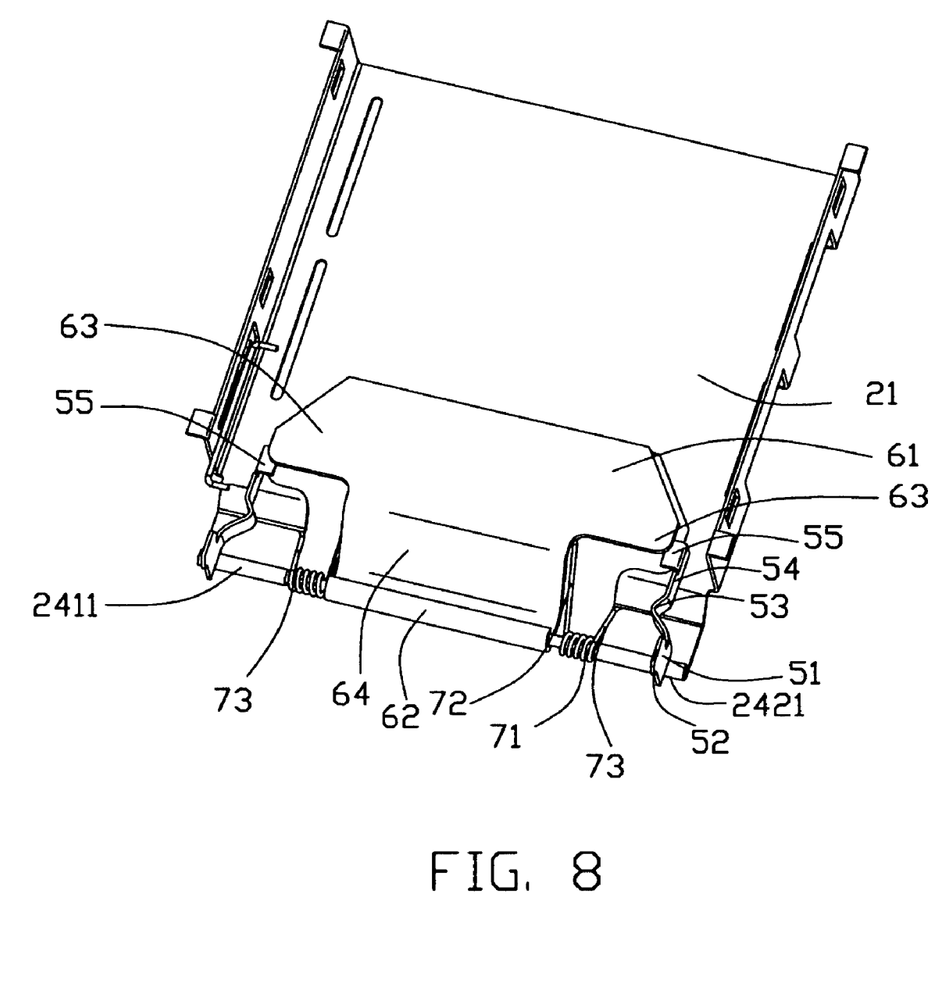
FIG. 8 is a view similar to FIG. 7 while taken from another aspect.

Referring to FIGS. 4 and 5, the electrical card connector 100 comprises an insulative housing 1. The insulative housing 1 has a plurality of contacts retained therein, an ejector 4 assembled thereto, a shielding shell 2 attached to a top thereof and a shutter mechanism (not labeled) assembled to the shielding shell 2.

Figure 1:
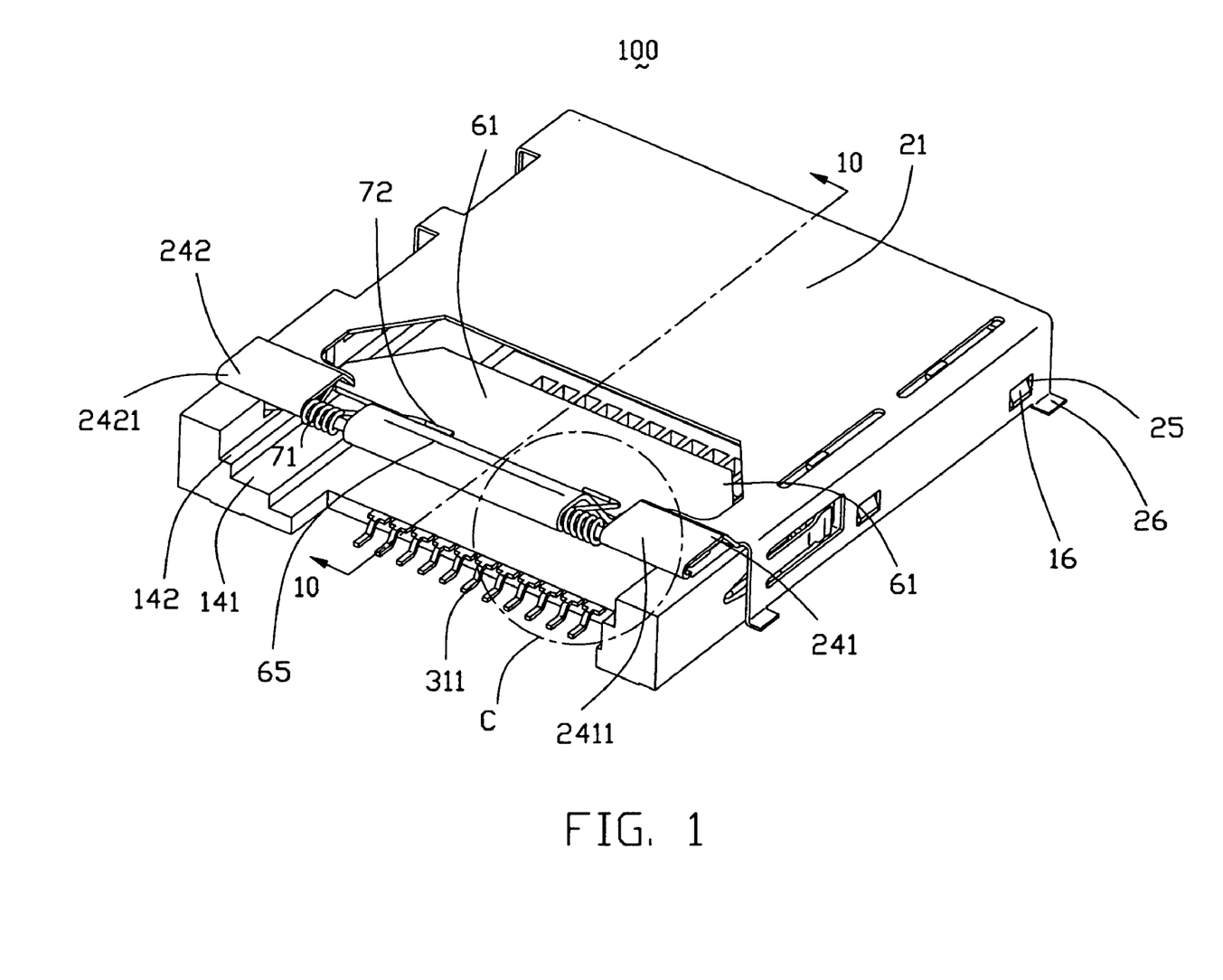
FIG. 1 is an assembled perspective view of an electrical card connector in accordance with the present invention.
Figure 2:
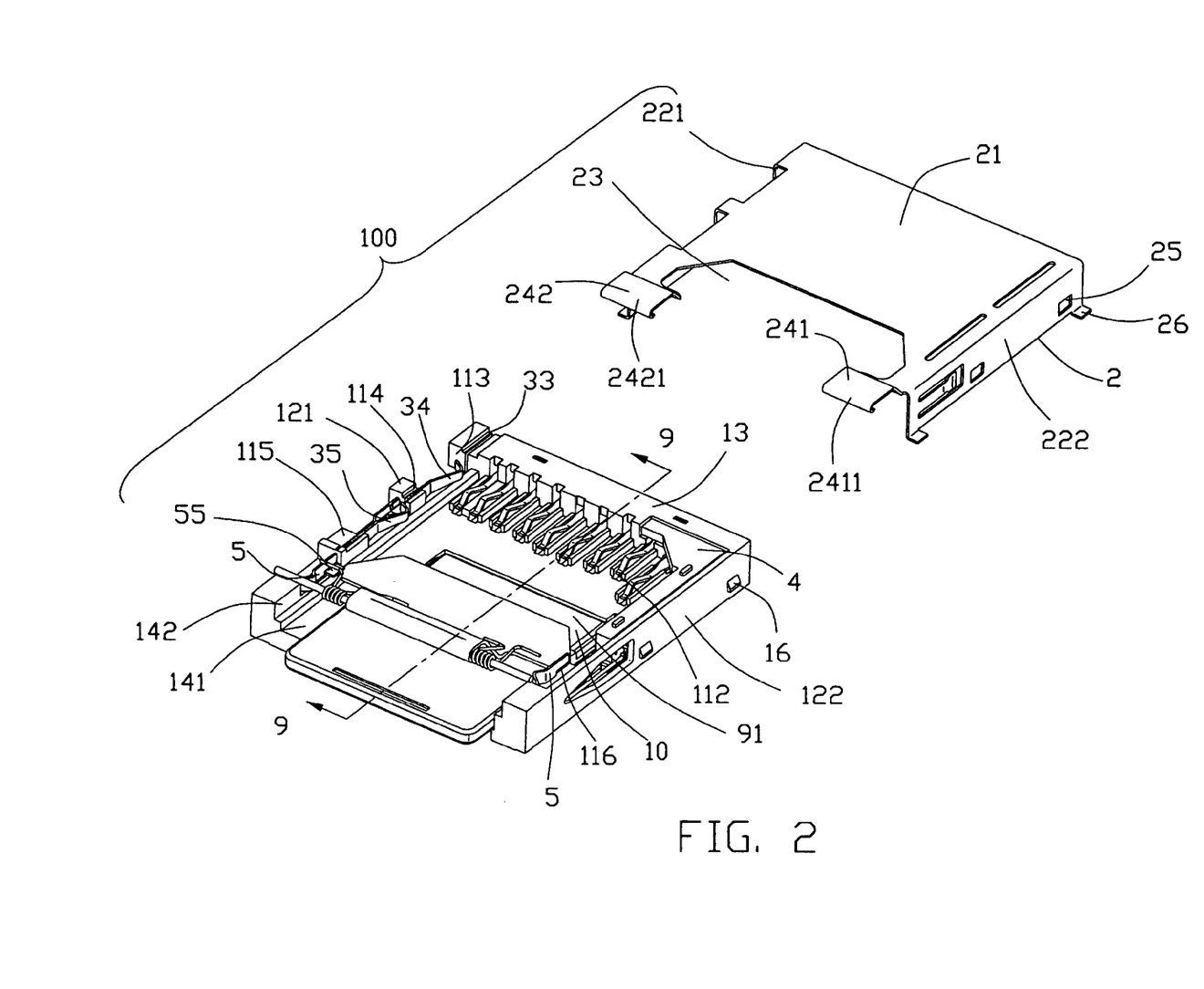

Referring to FIG. 2, in conjunction with FIGS. 4, 5, the insulative housing 1 is a substantially rectangular board, comprising a base 11, a first periphery wall 121, a second periphery wall 122, a rear wall 13 raising upwardly from the base 11 to thereby define a cavity 10 therebetween. The insulative housing 1 has one side opened to define an opening 15 for insertion of the MINI SD card 91 and SD card 92. A lower stepped section 141 having stepwise cross-section is formed above the base 11 and connects with periphery walls 121, 122 and rear wall 13. The lower stepped section 141 has a pair of upper stepped sections 142 provided above a pair of opposite edges thereof to form guide passages for the MINI SD card 91 and SD card 92 in a two-stairs shape.

The base 11 has a plurality of first contact recesses 111 defined at a front portion thereof. The lower stepped section 141 has a plurality of second contact recesses 112 defined thereon. The first periphery wall 121 has a grounding contact recess 113, a detective contact recess 114 and a protective contact recess 115 lengthwise defined thereon. The first periphery wall 121 and the second periphery wall 122 have a pair of grooves 116 defined thereon and two pairs of protrusions projecting outwardly therefrom.

The shielding shell 2 is formed by bending a punched metal plate, comprising a top wall 21, a first side beam 221 and a second side beam 222 respectively perpendicular to two opposite sides of the top wall 21. The top wall 21 has a cutout 23 defined at a front portion thereof for extension of the shutter mechanism. The top wall 21 has a pair of projecting arms 241, 242 extending forwardly therefrom. Each projecting arm 241, 242 is formed with an arc-like clasp portion 2411, 2421 bending downwardly and backwardly thererfrom. The first side beam 221 and second side beam 222 have two pairs of apertures 25 defined thereon for engaging with the protrusions 16, and a plurality of soldering portions 26 formed thereon for soldering onto a PCB (not shown).

The plurality of contacts include a plurality of first electrical contacts 31, second electrical contacts 32, grounding contacts 33, detective contacts 34 and protective contacts 35.

The shutter mechanism comprises a pair of bolts 5, a rotary portion 6, a pair of springs 7 and a shaft 8. Each bolt 5 is formed by bending a strip-like metal sheet, comprising a head portion 51, an insertion portion 52 extending downwardly from the head portion 51, a V-shaped bent portion 53 having an inwardly projecting top end, a tail portion 54, and a projecting portion 55 projecting inwardly from the tail portion 54.

The rotary portion 6 comprises a stop portion 61, a neck portion 64 extending obliquely and upwardly from a front side of the stop portion 61 and an engaging portion 62 formed at a top side of the neck portion 64. The stop portion 61 has a pair of opposite side portions curved laterally and obliquely to form a pair of resisting portions 63. The engaging portion 62 is bended downwardly to define an engaging slot 621 therein for retaining the shaft 8.

Each spring 7 comprises a twisted coil portion 71, an L-shaped upper finger 72 and an L-shaped lower finger 73 respectively extending from opposite ends of the coil portion 71.

Referring to FIGS. 1-8, in assembly of the electrical card connector 100, the plurality of first electrical contacts 31, second electrical contacts 32, grounding contacts 33, detective contacts 34 and protective contacts 35 are firstly inserted into the first contact recesses 111, second contact recesses 112, grounding contact recesses 113, detective contact recesses 114 and protective contact recesses 115, respectively. The ejector 4 is assembled to the insulative housing 1.

Figure 3:
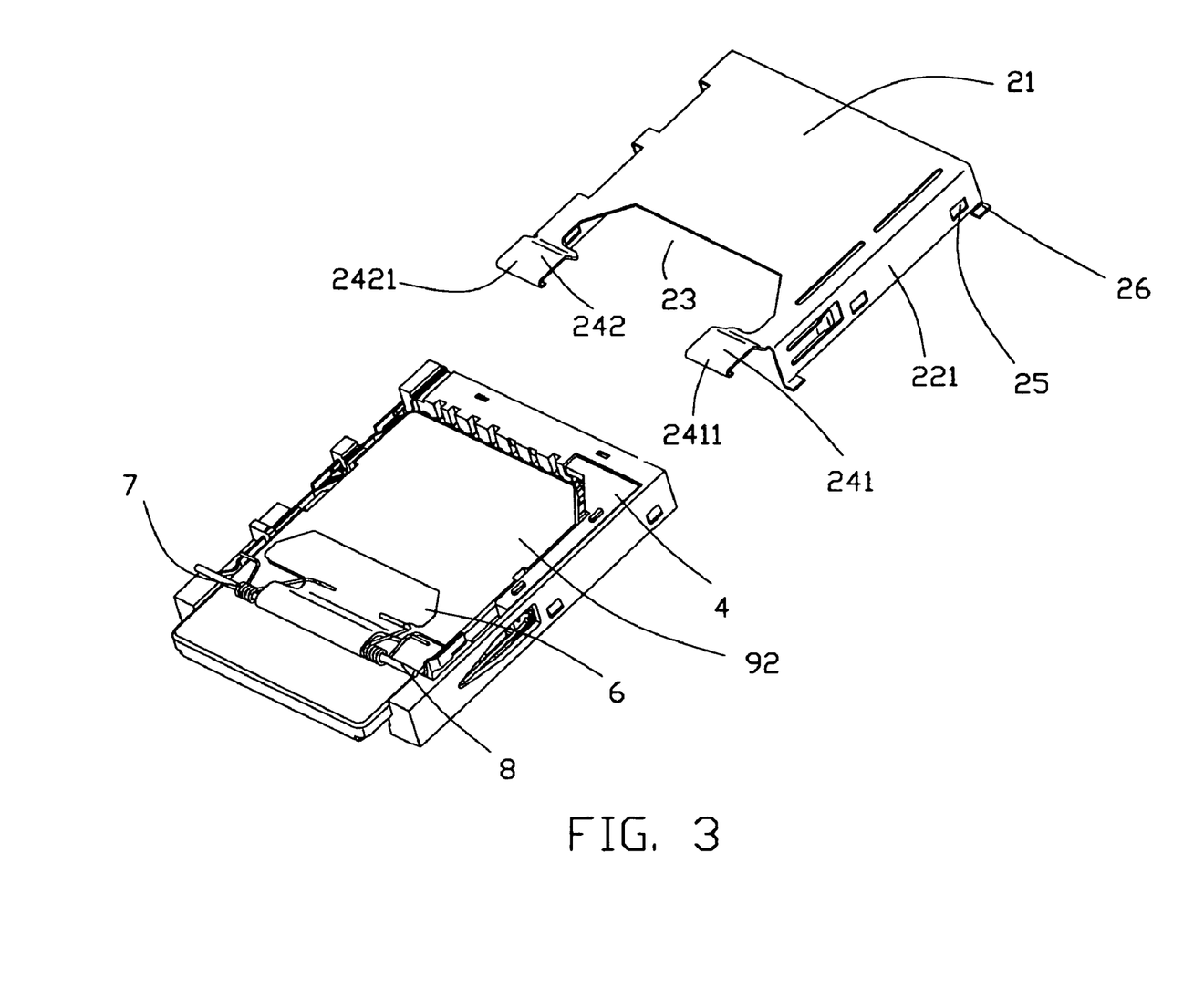

Referring to FIG. 3, The pair of bolts 5 are mounted on the insulative housing 1, with the insertion portions 52 thereof are inserted into the corresponding grooves 116, the shaft 8 is retained in the engaging slot 621 of the rotary portion 6. The pair of springs 7 are mounted on the shaft 8 and disposed beside opposite sides of the engaging portion 62, with the upper fingers 72 resisting against an upper surface of the neck portion 64. The rotary portion 6 together with the springs 7 and shaft 8 is assembled to the insulative housing 1, with the stop portion 61 thereof positioned beneath the projecting portions 55 of the bolts 5. The shutter mechanism is made in one mechanism as a whole.

The shutter mechanism is then assembled to the shielding shell 2, with the shaft 8 being clasped by the clasp portion 2411, 2421 and the lower fingers 73 abutting against a lower surface of the projecting arms 241, 242. The shielding shell 2 together with the shutter mechanism is attached to the insulative housing 1, with the top wall 21 thereof attached to the top of the insulative housing 1 and the side beams 221, 222 shielding the periphery walls 121, 122. The shielding shell 2 is fastened to the insulative housing 1, with the apertures 25 thereof engaging with the protrusions 16.

Referring to FIGS. 2 and 9, in use, inserting the MINI SD card 91 into the cavity 10 from the opening 15, with opposite edges of the MINI SD card 91 sliding along inner surfaces of the lower stepped section 141. The stop portion 61 is obliged to upwardly revolve around the shaft 8 till the resisting portions 63 is blocked off by the projecting portions 55 of the bolts 5. The MINI SD card 91 electrically connect with the first electrical contacts 31 when it is fully inserted in the cavity 10. The MINI SD card 91 is fastened to the connector 100 due to a pressure provided by the rotary portion 6 and a resilient force provided by the springs 7.

Referring to FIGS. 3 and 10, the SD card 92 is inserted into cavity 10 from the opening 15, with opposite edges thereof sliding along the upper stepped sections 142. Once contacting with the bent portions 53 of the bolts 5, the SD card 92 would depress the bent portions 53 outwardly due to the large dimensions in width thereof. Meanwhile, the projecting portions 55 spread resiliently outwardly together with the bent portions 53 for extension of the stop portion 61, which is urged to rotate upwardly outwardly through the cutout 23. The SD card 92 is fully inserted in the cavity 10 and electrically connect with the second electrical contacts 32. The SD card 92 is fastened to the connector 100 due to a pressure provided by the shielding shell 2 and the resilient force provided by the springs 7.

In a second embodiment, the rotary portion 6 could engage with the bolts 5 to permit the insertion movement of the SD card 92 without the resilient force provided by the springs 7.

In a third embodiment, the rotary portion 6 could be actuated by the springs 7 without the engagement between the rotary portion 6 and the bolts 5. When the MINI SD card 91 is inserted into the cavity 10, the stop portion 61 is fixed beneath the shielding shell 2 by the springs 7 for full insertion of the MINI SD card 91. When the SD card 92 is inserted in, the stop portion 61 rotates upwardly outside the shielding shell 2 through the cutout 23 for permitting the full insertion of the SD card 92.

When insertion of the SD card 92, the bent portions 53 together with the projecting portions 55 are resiliently outwardly depressed by the SD card 92 for allowing the stop portion 61 to upwardly rotate. The shutter mechanism consisting of the rotary portion 6, springs 7 and the shaft 8 agilely engages with the bolts 5 for compatibly insertion of the MINI SD card 91 and SD card 92. Therefore, it is convenient to operate the shutter mechanism and the shutter mechanism is thus hard to be impaired.

However, the disclosure is illustrative only, changes may be made in detail, especially in matter of shape, size, and arrangement of parts within the principles of the invention.

What is claimed is:

1. An electrical card connector for compatible insertion of at least two kinds of electronic cards having different sizes, comprising:
   an insulative housing defining a cavity for retaining the electronic cards;
   a plurality of first electrical contacts and second electrical contacts retained in the insulative housing and respectively connected with the different electronic cards;
   an ejector assembled to the insulative housing;
   a shielding shell attached to a top of the insulative housing; and
   a shutter mechanism assembled to the shielding shell and comprising a shaft, a bolt mounted on the insulative housing, and a rotary portion engaging with the bolt;
   wherein said bolt is capable of blocking off the upwardly rotating of the rotary portion when the electronic card having a smaller size is inserted, and is capable of being resiliently outwardly depressed by the electronic card having a larger size thereby permitting a fully insertion of the larger electronic card.

2. The electrical card connector as claimed in claim 1, wherein said rotary portion comprises a stop portion, and wherein the bolt has a projecting portion projecting inwardly therefrom and extending above the stop portion.

3. The electrical card connector as claimed in claim 2, wherein said bolt is provided with an inwardly bending bent portion adapted for being outwardly depressed by the large electronic card.

4. The electrical card connector as claimed in claim 3, wherein said bolt is formed with an insertion portion, and wherein said insulative housing defines thereon a groove for insertion of the corresponding insertion portion.

5. The electrical card connector as claimed in claim 2, wherein said rotary portion is formed with a neck portion and an engaging slot for retaining the shaft.

6. The electrical card connector as claimed in claim 5, wherein said shielding shell comprises a top wall defining a cutout for extension of the stop portion, a pair of side beams and at least a projecting arm extending forwardly from the top wall for clasping the shaft.

7. The electrical card connector as claimed in claim 6, wherein said side beams have a plurality of apertures defined thereon for engaging with a plurality of protrusions formed on the insulative housing.

8. The electrical card connector as claimed in claim 6, wherein said shielding shell is provided with a plurality of soldering portions for soldering onto a PCB.

9. The electrical card connector as claimed in claim 2, wherein said shutter mechanism comprises at least a spring mounted on the shaft for engaging with the rotary portion.

10. The electrical card connector as claimed in claim 9, wherein said at least one spring is a torsion spring and comprises a finger resisting against an upper surface of the rotary portion and another finger abutting against the shielding shell.

11. The electrical card connector as claimed in claim 1, wherein said insulative housing comprises a base, a plurality of periphery walls and a rear wall partially surrounding the cavity.

12. The electrical card connector as claimed in claim 11, wherein said insulative housing has a lower stepped section formed above the base and a pair of upper stepped section formed above opposite edges of the lower stepped section to form guide passages for the electronic cards.

13. An electrical card connector for compatibly receiving at least a small electronic card and a large electronic card, comprising:
   an insulative housing defining a cavity for insertions of the electronic cards;
   a plurality of first electrical contacts and second electrical contacts retained in the insulative housing and respectively connected with the small electronic card and the large electronic card;
   a shielding shell attached to a top of the insulative housing; and
   a shutter mechanism assembled to the shielding shell and comprising a shaft, a rotary portion pivotable around said shaft, and at least a spring engaging with the rotary portion and exerting a resilient force on said rotary portion.

14. The electrical card connector as claimed in claim 13, wherein said spring is mounted on the shaft and comprises a coil portion, an L-shaped upper finger resting against an upper surface of a neck portion and an L-shaped lower finger abutting against the shielding shell.

15. The electrical card connector as claimed in claim 14, wherein said shielding shell comprises a top wall defining a cutout for extension of the stop portion, a pair of side beams and at least a projecting arm extending forwardly from the top wall for clasping the shaft.

16. The electrical card connector as claimed in claim 15, wherein said shielding shell is provided with a plurality of soldering portions for soldering onto a PCB.

17. The electrical card connector as claimed in claim 15, wherein said side beams of the shielding shell have a plurality of apertures defined thereon for engaging with a plurality of protrusions formed on the insulative housing.

18. The electrical card connector as claimed in claim 13, wherein said insulative housing comprises a base, a plurality of periphery walls, a rear wall, and the cavity defined therebetween.

19. The electrical card connector as claimed in claim 18, wherein said insulative housing has a lower stepped section formed above the base and a pair of upper stepped sections formed above opposite edges of the lower stepped section to form guide passages for the electronic cards.

* * * * *